(12) United States Patent
Wang

(10) Patent No.: US 11,954,439 B2
(45) Date of Patent: Apr. 9, 2024

(54) DATA LABELING METHOD AND DEVICE, AND STORAGE MEDIUM

(71) Applicant: BOE Technology Group Co., Ltd., Beijing (CN)

(72) Inventor: Bingqian Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 392 days.

(21) Appl. No.: 17/423,835

(22) PCT Filed: Aug. 24, 2020

(86) PCT No.: PCT/CN2020/110718
§ 371 (c)(1),
(2) Date: Jul. 16, 2021

(87) PCT Pub. No.: WO2021/036968
PCT Pub. Date: Mar. 4, 2021

(65) Prior Publication Data
US 2022/0075950 A1 Mar. 10, 2022

(30) Foreign Application Priority Data
Aug. 30, 2019 (CN) .......................... 201910814100.0

(51) Int. Cl.
*G06F 40/295* (2020.01)
(52) U.S. Cl.
CPC .................................. *G06F 40/295* (2020.01)
(58) Field of Classification Search
CPC ............................. G06F 40/295; G06F 16/367
See application file for complete search history.

(56) References Cited

U.S. PATENT DOCUMENTS

| 9,075,796 | B2 * | 7/2015 | Markatou | .............. G16H 50/70 |
| 9,216,835 | B2 * | 12/2015 | Galicia | ..................... B65C 9/42 |
| 11,386,266 | B2 * | 7/2022 | Davidson | ............ G06F 16/3347 |
| 2012/0324347 | A1 | 12/2012 | Monroe et al. | |
| 2018/0203916 | A1 | 7/2018 | Rafsky et al. | |

FOREIGN PATENT DOCUMENTS

| CN | 101719122 | A | | 6/2010 | |
| CN | 104298714 | A | * | 1/2015 | ......... G06F 16/3344 |
| CN | 105068999 | A | | 11/2015 | |
| CN | 108959248 | A | | 12/2018 | |
| CN | 108959255 | A | | 12/2018 | |
| CN | 109190110 | A | | 1/2019 | |
| CN | 109472033 | A | | 3/2019 | |
| CN | 110516252 | A | | 11/2019 | |

OTHER PUBLICATIONS

CN201910814100.0 first office action and search report.
CN201910814100.0 second office action.

\* cited by examiner

*Primary Examiner* — Abul K Azad
(74) *Attorney, Agent, or Firm* — IPro, PLLC

(57) ABSTRACT

A data labeling method and device and a computer-readable storage medium. The method includes: based on a knowledge graph, remotely acquiring data to be labeled; performing data cleaning and pre-labeling to the data to be labeled, to obtain pre-labeled data; and performing labeling correction to the pre-labeled data.

15 Claims, 3 Drawing Sheets when the monitored entity labeling action is the new-entity labeling action, determining that a first entity corresponding to the new-entity labeling action is a labeling-omitted new entity, and labeling the first entity located at other positions in the pre-labeled data ~301 when the monitored entity labeling action is the erroneous-labeling eliminating action, determining that a second entity corresponding to the erroneous-labeling eliminating action is an erroneously labeled entity, counting up a time quantity of the second entity being eliminated the labeling, and according to the time quantity of the second entity being eliminated the labeling, performing labeling elimination to the second entity located at other positions in the pre-labeled data ~302

Fig. 3

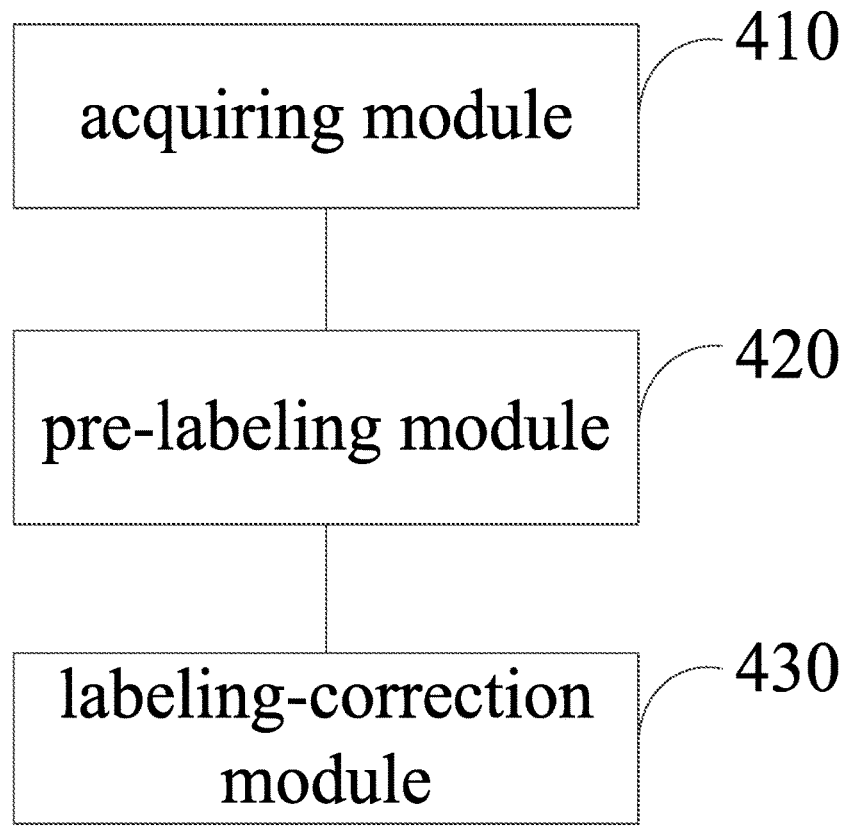

Fig. 4

DATA LABELING METHOD AND DEVICE, AND STORAGE MEDIUM

CROSS REFERENCE TO RELEVANT APPLICATIONS

The present application claims the priority of the Chinese patent application filed on Aug. 30, 2019 with the application number of CN201910814100.0, the disclosure of which is incorporated herein in its entirety by reference.

TECHNICAL FIELD

The present disclosure relates to the technical field of data processing, and particularly relates to a data labeling method and device and a computer-readable storage medium.

BACKGROUND

With the development of artificial intelligence and knowledge graphs and the breakthrough of the related techniques, the technique of Natural Language Processing (referred to for short as NLP) has exhibited its important function in many fields. Particularly, regarding the construction of knowledge graphs in the field of art, the extraction of the entity relation is an important step of the construction of a knowledge graph, and the identification of named entities is the first step of the relation extraction. Most of conventional methods of entity identification employ deep learning, which naturally depends on entity data that have been labeled completely.

Currently, the labeling of entity data is usually performed artificially on a labeling platform, which greatly affects the labeling efficiency, and requires an extremely high human cost.

SUMMARY

In the first aspect of the embodiments of the present disclosure, there is provided a data labeling method, wherein the method comprises:
  based on a knowledge graph, remotely acquiring data to be labeled;
  performing data cleaning and pre-labeling to the data to be labeled, to obtain pre-labeled data; and
  performing labeling correction to the pre-labeled data.

In an embodiment, the step of performing labeling correction to the pre-labeled data comprises:
  monitoring a labeling action to an entity in the pre-labeled data, and according to the monitored entity labeling action, performing labeling correction to the pre-labeled data.

In an embodiment, the step of, according to the monitored entity labeling action, performing labeling correction to the pre-labeled data comprises:
  according to the monitored entity labeling action, determining a labeling-omitted new entity and an erroneously labeled entity in the pre-labeled data, and according to the labeling-omitted new entity and the erroneously labeled entity, performing labeling correction to the pre-labeled data.

In an embodiment, the entity labeling action comprises a new-entity labeling action and an erroneous-labeling eliminating action; and
  the step of, according to the monitored entity labeling action, determining the labeling-omitted new entity and the erroneously labeled entity in the pre-labeled data, and according to the labeling-omitted new entity and the erroneously labeled entity, performing labeling correction to the pre-labeled data comprises:
  when the monitored entity labeling action is the new-entity labeling action, determining that a first entity corresponding to the new-entity labeling action is a labeling-omitted new entity, and labeling the first entity located at other positions in the pre-labeled data; and
  when the monitored entity labeling action is the erroneous-labeling eliminating action, determining that a second entity corresponding to the erroneous-labeling eliminating action is an erroneously labeled entity, counting up a time quantity of the second entity being eliminated the labeling, and according to the time quantity of the second entity being eliminated the labeling, performing labeling elimination to the second entity located at other positions in the pre-labeled data.

In an embodiment, the step of, according to the time quantity of the second entity being eliminated the labeling, performing labeling elimination to the second entity located at other positions in the pre-labeled data comprises:
  counting up a total quantity of labeling actions to the second entity;
  calculating a ratio of the time quantity of the second entity being eliminated the labeling to the total quantity of the labeling actions; and
  when the ratio is greater than a preset threshold, performing labeling elimination to the second entity located at other positions in the pre-labeled data.

In an embodiment, the step of, based on the knowledge graph, remotely acquiring the data to be labeled comprises:
  according to the knowledge graph, acquiring a triad entity pair containing entities to be labeled;
  determining a vertical website corresponding to the knowledge graph; and
  based on the triad entity pair, remotely acquiring from the vertical website the data to be labeled containing the triad entity pair.

In an embodiment, the step of, based on the triad entity pair, remotely acquiring from the vertical website the data to be labeled containing the triad entity pair comprises: acquiring a text content in the vertical website;
  for the triad entity pair and a corresponding entity relation thereof, searching the text content in the vertical website for a sentence containing the triad entity pair; and
  using the searched sentence containing the triad entity pair as the data to be labeled having the corresponding entity relation.

In an embodiment, the step of performing data cleaning and pre-labeling to the data to be labeled, to obtain the pre-labeled data comprises:
  determining whether the data to be labeled contain a pronoun;
  if yes, according to an inter-sentence meaning of the data to be labeled, replacing the pronoun in the data to be labeled with a corresponding entity word, and according to a plurality of instances of the entity word and entity types of the plurality of entity words, pre-labeling the data to be labeled obtained after the pronoun replacement to obtain the pre-labeled data; and
  if no, according to a plurality of entity words and entity types of the plurality of entity words, pre-labeling the data to be labeled, to obtain the pre-labeled data.

In the second aspect of the embodiments of the present disclosure, there is provided a data labeling device, wherein the device comprises:
  a processor; and a memory, wherein the memory stores a computer instruction, and the computer instruction, when executed by the processor, causes the processor to perform the operations of:

based on a knowledge graph, remotely acquiring data to be labeled;

performing data cleaning and pre-labeling to the data to be labeled, to obtain pre-labeled data; and performing labeling correction to the pre-labeled data.

In an embodiment, the computer instruction, when executed by the processor, causes the processor to further perform the operations of:

monitoring a labeling action to an entity in the pre-labeled data, and according to the monitored entity labeling action, performing labeling correction to the pre-labeled data.

In an embodiment, the computer instruction, when executed by the processor, causes the processor to further perform the operations of:

according to the monitored entity labeling action, determining a labeling-omitted new entity and an erroneously labeled entity in the pre-labeled data, and according to the labeling-omitted new entity and the erroneously labeled entity, performing labeling correction to the pre-labeled data.

In an embodiment, the entity labeling action comprises a new-entity labeling action and an erroneous-labeling eliminating action; and the computer instruction, when executed by the processor, causes the processor to further perform the operations of:

when the monitored entity labeling action is the new-entity labeling action, determining that a first entity corresponding to the new-entity labeling action is a labeling-omitted new entity, and labeling the first entity located at other positions in the pre-labeled data; and when the monitored entity labeling action is the erroneous-labeling eliminating action, determining that a second entity corresponding to the erroneous-labeling eliminating action is an erroneously labeled entity, counting up a time quantity of the second entity being eliminated the labeling, and according to the time quantity of the second entity being eliminated the labeling, performing labeling elimination to the second entity located at other positions in the pre-labeled data.

In an embodiment, the computer instruction, when executed by the processor, causes the processor to further perform the operations of:

counting up a total quantity of labeling actions to the second entity;

calculating a ratio of the time quantity of the second entity being eliminated the labeling to the total quantity of the labeling actions; and when the ratio is greater than a preset threshold, performing labeling elimination to the second entity located at other positions in the pre-labeled data.

In an embodiment, the computer instruction, when executed by the processor, causes the processor to further perform the operations of:

according to the knowledge graph, acquiring a triad entity pair containing entities to be labeled;

determining a vertical website corresponding to the knowledge graph; and based on the triad entity pair, remotely acquiring from the vertical website the data to be labeled containing the triad entity pair.

In an embodiment, the computer instruction, when executed by the processor, causes the processor to further perform the operations of:

acquiring a text content in the vertical website;

for the triad entity pair and a corresponding entity relation thereof, searching the text content in the vertical website for a sentence containing the triad entity pair; and using the searched sentence containing the triad entity pair as the data to be labeled having the corresponding entity relation.

In an embodiment, the computer instruction, when executed by the processor, causes the processor to further perform the operations of:

determining whether the data to be labeled contain a pronoun;

if yes, according to an inter-sentence meaning of the data to be labeled, replacing the pronoun in the data to be labeled with a corresponding entity word, and according to a plurality of instances of the entity word and entity types of the plurality of entity words, pre-labeling the data to be labeled obtained after the pronoun replacement to obtain the pre-labeled data; and if no, according to a plurality of entity words and entity types of the plurality of entity words, pre-labeling the data to be labeled, to obtain the pre-labeled data.

In the third aspect of the embodiments of the present disclosure, there is provided a nonvolatile computer-readable storage medium, storing a computer program, wherein the computer program, when executed by a processor, implements the data labeling method according to any one of the above items.

Some of the additional aspects and advantages of the present disclosure will be given in the following description, and some will become apparent from the following description or be known from the implementation of the present disclosure.

BRIEF DESCRIPTION OF THE DRAWINGS

FIG. 3 is a flow chart of the data labeling method according to yet another embodiment of the present disclosure;

FIG. 4 is a schematic structural diagram of the data labeling apparatus according to an embodiment of the present disclosure;

DETAILED DESCRIPTION

Figure 1:
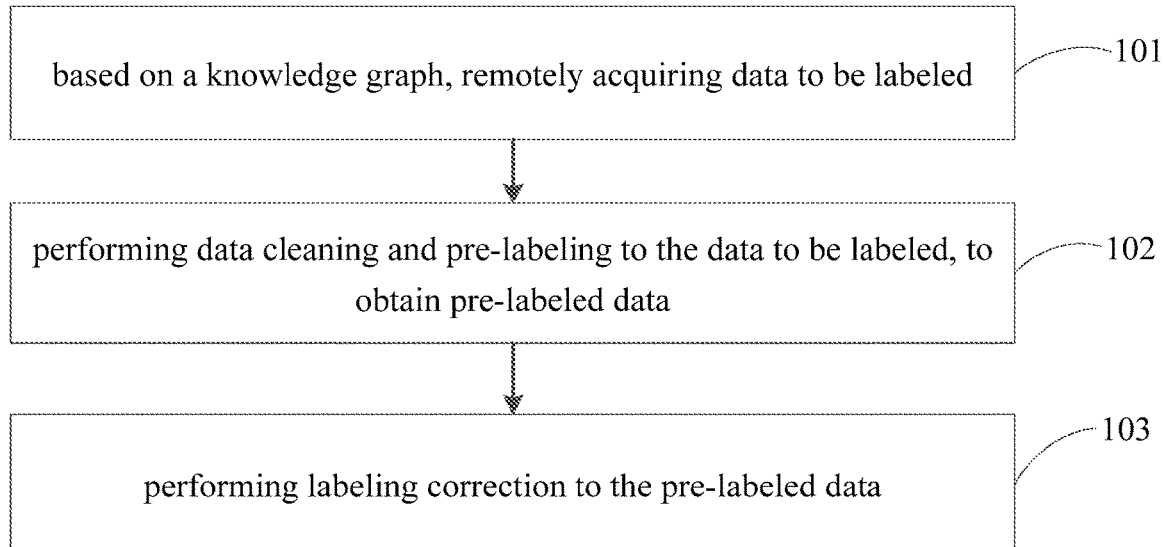
FIG. 1 is a flow chart of the data labeling method according to an embodiment of the present disclosure.

The embodiments of the present disclosure will be described in detail below, and the examples of the embodiments are illustrated in the drawings, wherein the same or similar reference numbers throughout the drawings indicate the same or similar elements or elements having the same or similar functions. The embodiments described below with reference to the drawings are exemplary, are intended to interpret the present disclosure, and should not be construed as a limitation on the present disclosure.

Accordingly, an embodiment of the present disclosure provides a data labeling method. The method, while ensuring the quality of the data labeling, automatically labels the entities in the data, and then, by labeling correction, handles the problems of omitted labeling and erroneous labeling, which reduces the burden of artificial data labeling to a certain extent, and increases the efficiency of entity data labeling. The data labeling method and apparatus and the relevant devices thereof according to the embodiments of the present disclosure will be described below with reference to the drawings.

FIG. 1 is a schematic flow chart of the data labeling method according to an embodiment of the present disclosure.

As shown in FIG. 1, the data labeling method comprises the following steps:

Step 101: based on a knowledge graph, remotely acquiring data to be labeled.

Particularly, the data may be corpus. The corpus may be understood as a language material, and may include spoken-language materials and text materials. Its source may be websites, textbooks, newspaper, comprehensive periodicals, news materials, books and so on.

In an embodiment of the present disclosure, the acquirement of the data to be labeled may comprise, according to, for example, a knowledge graph in the field of art, acquiring a triad entity pair containing entities to be labeled; determining a vertical website corresponding to the field of art; and subsequently, based on the triad entity pair of the knowledge graph in the field of art, by using the method of remote supervision, acquiring from the vertical website the data to be labeled containing the triad entity pair.

As an example, in the process of acquiring the data to be labeled, firstly, a triad set S={tuple1, tuple2, . . . tuplei} containing the entities to be labeled may be acquired by using the knowledge graph, wherein the tuplei refers to a triad such as <e1, r12, e2>, wherein e1 and e2 are the entities to be labeled, and r12 is the relation between e1 and e2, for example, <DaVinci, work, Mona Lisa>. In addition, the triad <e1, r12, e2> may be further subdivided into subsets; for example, the full name of DaVinci is Leonardo da Vinci, so one of the subsets is <Leonardo da Vinci, work, Mona Lisa>, and the corresponding triad may be expressed as <S_e1, r12, e2>, wherein S_e1 and S_e2 represent the set of the same one entity.

In an embodiment of the present disclosure, the data to be labeled may be obtained from a search engine, and may also be acquired from a corresponding website in the field of art. As an example, this step may comprise, after it is determined that the target vertical field is the field of art, according to the knowledge graph in the field of art, acquiring a triad containing the entities to be labeled, determining the vertical website corresponding to the field of art, and, based on the triad entity pair of the knowledge graph in the field of art and its corresponding entity relation, by retrieval, searching the text content in the vertical website for a sentence containing the triad entity pair; and using the searched sentence containing the triad entity pair as the data to be labeled having the corresponding entity relation. For example, text data regarding the data to be labeled such as the painting work and the painter data may be acquired from the texts of the painter brief introduction or the painting work description in an art website, which can enable the obtained data to be labeled to have a high confidence to a certain extent. In addition, based on the triad of the knowledge graph in the field of art, the corresponding data to be labeled may be acquired from an art website by retrieval. For example, a triad entity pair is <DaVinci, work, Mona Lisa> and <Mona Lisa, collection location, Louvre>, and, based on the entity pair, it may be acquired from an art website that the data to be labeled are "Mona Lisa", which is an oil painting created by DaVinci, a painter living in the era of renaissance in Italy, and is currently collected in the museum of Louvre in France.

In an embodiment of the present disclosure, after the data to be labeled have been acquired, a noun-word list of the knowledge graph in the field of art may be acquired, wherein the noun-word list may contain multiple entity words and the entity types of the multiple entity words. In an embodiment, by acquiring the entities to be labeled contained in the triad of the knowledge graph in the field of art, according to the entities to be labeled contained in the triad, the noun-word list is generated. The entity types may be: a painter (Artist), a painting work (Paintings) and so on.

As an example, the triad set of the entities to be labeled is S={tuple1, tuple2, . . . tuplei}, wherein the tuplei refers to a triad such as <e1, r12, e2>, wherein e1 and e2 are the entities to be labeled, and r12 is the relation between e1 and e2. For example, taking the field of art as an example, it may be determined that the triad entity of the knowledge graph in the field of art is <DaVinci, work, Mona Lisa>, wherein DaVinci and Mona Lisa are the entities to be labeled, and all of the entities to be labeled in the triad entity pair may form the noun-word list. For example, the triad entity pair is <DaVinci, work, Mona Lisa> and <Mona Lisa, collection location, Louvre>, and the noun-word list contains DaVinci, Mona Lisa and Louvre.

Step 102: performing data cleaning and pre-labeling to the data to be labeled, to obtain pre-labeled data.

Figure 2:
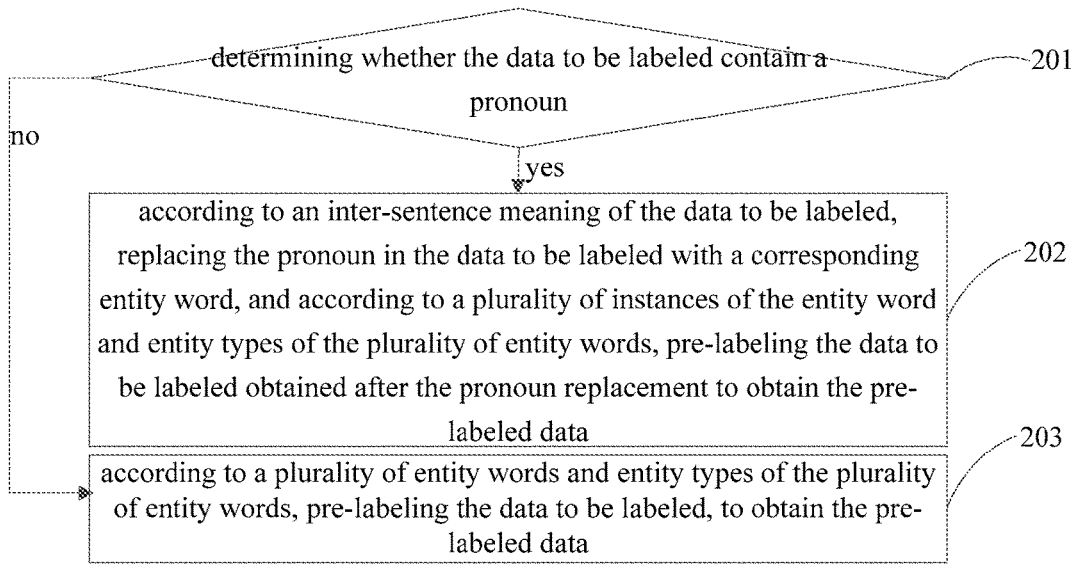
FIG. 2 is a flow chart of the data labeling method according to another embodiment of the present disclosure.

In an embodiment of the present disclosure, after the data to be labeled have been acquired, as shown in FIG. 2, the data to be labeled may undergo data cleaning and pre-labeling, to obtain pre-labeled data. The particular steps are as follows:

Step 201: determining whether the data to be labeled contain a pronoun.

In an embodiment of the present disclosure, this step may comprise firstly performing text-data cleaning to the data to be labeled, rectifying or deleting data in an erroneous format or redundant data, performing sentence segmentation to the data to be labeled obtained after the cleaning, performing word segmentation to the sentences obtained after the segmentation by using an NLP toolkit (for example, Jieba or Stanford CoreNLP), to obtain multiple segmented words corresponding to the data to be labeled, and determining whether the obtained segmented words include a pronoun. The pronoun may include but is not limited to a personal pronoun, a demonstrative pronoun, an interrogative pronoun, a reflexive pronoun, an indefinite pronoun and so on, for example, words such as "he", "it", "she" and "they".

Step 202: if yes, according to an inter-sentence meaning of the data to be labeled, replacing the pronoun in the data to be labeled with a corresponding entity word, and according to a plurality of instances of the entity word and entity types of the plurality of entity words, pre-labeling the data to be labeled obtained after the pronoun replacement to obtain the pre-labeled data.

Optionally, this step may comprise, if the data to be labeled contain a pronoun, according to an inter-sentence meaning of the data to be labeled, replacing the pronoun in the data to be labeled with a corresponding entity word, and according to a plurality of instances of the entity word and entity types of the plurality of entity words, pre-labeling the data to be labeled obtained after the pronoun replacement to obtain the pre-labeled data. Accordingly, by performing anaphora resolution to the pronoun in the data to be labeled, the triad entity pair can be matched better.

Step 203: if no, according to a plurality of entity words and entity types of the plurality of entity words, pre-labeling the data to be labeled, to obtain the pre-labeled data.

In an embodiment of the present disclosure, this step may comprise, if the data to be labeled do not contain a pronoun, according to a plurality of entity words and entity types of the plurality of entity words, pre-labeling the data to be labeled, to obtain the pre-labeled data.

In other words, after the data to be labeled have undergone the word segmentation by using the NLP toolkit, and the pronoun in the data to be labeled has been replaced with the corresponding entity word, the data to be labeled may undergo pre-labeling according to the entity words in the noun-word list and their entity types, to obtain the pre-labeled data. For example, this step may comprise matching the entity words in the noun-word list with the segmented words corresponding to the obtained data to be labeled, to determine the entity words contained in the data to be labeled, and according to the entity types of the entity words in the noun-word list, determining the entity types corresponding to the entity words contained in the data to be labeled, to complete the pre-labeling to the data to be labeled, to obtain the pre-labeled data of the data to be labeled.

As an example, the triad entity pair is <Van Gogh, school, neoimpressionism>, <Van Gogh, representative work, the Potato Eaters>, and <Van Gogh, representative work, the Side of Seine>, and this step may comprise, by using a vertical website, acquiring the data to be labeled, performing cleaning and sentence segmentation to the data to be labeled, and, according to multiple entity words and the entity types of the multiple entity words, performing pre-labeling to the data to be labeled, to obtain that the pre-labeled data are that: the early period works of <Person>@Van Gogh</Person> are influenced by the painting schools of <Class>@impressionism</Class> and <Class>@neoimpressionism</Class>, and his representative works include "<Paintings>@the Potato Eaters</Paintings>", "<Paintings>@the Side of Seine</Paintings>" and so on.

Step 103: performing labeling correction to the pre-labeled data.

The method of the steps 101-102 of automatically labeling the entity data has the problems of omitted labeling and erroneous labeling. For example, in the sentence that "'<ART>Hope</ART>' is a cloth oil painting created by <PER>Gustav Klimt</PER>, a painter of the painting school of Vienna Secession, in the year of 1903", the "Hope" is labeled as a painting work. However, in the sentence that "<PER>Manhay</PER> is a native-born Parisian, and is born of the upper class; his father is a judge, and <ART>hope<ART> that <PER>Manhay</PER>will become a lawyer or an officer; however, he insists in studding paining", the "hope" is also labeled as a painting work, which results in erroneous labeling. Therefore, the labeled data are required to undergo labeling correction. For example, machine or artificial examination and verification is used to perform the labeling correction to the data, to correct erroneously labeled entities and re-label labeling-omitted entity data.

In an embodiment of the present disclosure, in order to further confirm the accuracy of the data labeling, and prevent the problems of omitted labeling and erroneous labeling of the data, the pre-labeled data may be provided to a data-labeling expert, whereby the data-labeling expert examines and verifies the pre-labeled data.

In an embodiment, this step may comprise determining from the pre-labeled data all of the entities that are labeled, and providing the pre-labeled data to the data-labeling expert, wherein all of the entities that are labeled in the pre-labeled data may be displayed by highlighted displaying by using a regular expression. For example, the regular expression "r'\<.*?\>\@.*?\<.*?\>'" may match all of the entities Entity that are labeled by <*>Entity</*>.

In an embodiment of the present disclosure, after the pre-labeled data have been provided to the data-labeling expert, in order to reduce the workload of the artificial examination and verification, an automatic-recommendation labeling and scoring mechanism may be used to assist the task of artificial examination and verification. Particularly, this step may comprise monitoring a labeling action to an entity in the pre-labeled data, and according to the monitored entity labeling action, performing labeling correction to the pre-labeled data. As an example, this step may comprise, according to the monitored entity labeling action, determining a labeling-omitted new entity and an erroneously labeled entity in the pre-labeled data, and according to the labeling-omitted new entity and the erroneously labeled entity, performing labeling correction to the pre-labeled data. The entity labeling action comprises a new-entity labeling action and an erroneous-labeling eliminating action. In an embodiment, as shown in FIG. 3, the particular steps of the step of, according to the monitored entity labeling action, determining the labeling-omitted new entity and the erroneously labeled entity in the pre-labeled data, and according to the labeling-omitted new entity and the erroneously labeled entity, performing labeling correction to the pre-labeled data include:

Step 301: when the monitored entity labeling action is the new-entity labeling action, determining that a first entity corresponding to the new-entity labeling action is a labeling-omitted new entity, and labeling the first entity located at other positions in the pre-labeled data; and Step 302: when the monitored entity labeling action is the erroneous-labeling eliminating action, determining that a second entity corresponding to the erroneous-labeling eliminating action is an erroneously labeled entity, counting up a time quantity of the second entity being eliminated the labeling, and according to the time quantity of the second entity being eliminated the labeling, performing labeling elimination to the second entity located at other positions in the pre-labeled data.

In an embodiment of the present disclosure, this step may comprise, when the data-labeling expert is examining and verifying the entities that have been labeled, by supervising the keyboard instructions, labeling the labeling-omitted new entity and eliminating the erroneously labeled entity. When the monitored entity labeling action is the new-entity labeling action, i.e., when an entity is examined and verified as labeling-omitted, the data-labeling expert labels the labeling-omitted entity, and the background of a server detects the labeling, adds the new entity into the corresponding noun-word list according to the labeling type, and automatically recommends and labels all of that entities in the other positions in the pre-labeled data as the corresponding entity type. When the monitored entity labeling action is the erroneous-labeling eliminating action, i.e., when an entity is examined and verified as erroneously labeled, the data-labeling expert eliminates the labeling of the entity, and the background of the server detects the labeling, and eliminates the labeling of all of that entities in the other positions in the pre-labeled data.

In addition, in an embodiment, the step of, according to the time quantity of the second entity being eliminated the labeling, performing labeling elimination to the second entity located at other positions in the pre-labeled data comprises: counting up a total quantity of labeling actions to the second entity; calculating a ratio of the time quantity of the second entity being eliminated the labeling to the total quantity of the labeling actions; and when the ratio is greater than a preset threshold, performing labeling elimination to the second entity located at other positions in the pre-labeled data.

In other words, when an entity is examined and verified as erroneously labeled, the data-labeling expert eliminates the labeling of the entity, and the background of the server detects the labeling, records the entity, and counts up the ratio of the time quantity of the entity being eliminated the labeling to the total quantity of the labeling actions. When the ratio is greater than a preset threshold, the server may, by using regular expression matching, automatically eliminate all of the labelings of that entity in the other positions in the pre-labeled data, and that entity will not be automatically labeled again in the subsequent labeling process.

The data labeling method according to the embodiments of the present disclosure, by, based on a knowledge graph, remotely acquiring data to be labeled; performing data cleaning and pre-labeling to the data to be labeled, to obtain pre-labeled data; and performing labeling correction to the pre-labeled data, can realize, while ensuring the quality of the data labeling, automatically labeling the entities in the data by using the NLP technique, and then, by labeling correction, handling the problems of omitted labeling and erroneous labeling, which reduces the burden of artificial data labeling to a certain extent, and increases the efficiency of entity data labeling.

Correspondingly to the data labeling method according to the above embodiments, an embodiment of the present disclosure further provides a data labeling apparatus. Because the data labeling apparatus according to the embodiment of the present disclosure corresponds to the data labeling method according to the above embodiments, the above-described embodiments of the data labeling method also apply to the data labeling apparatus according to the present embodiment, and will not be described in detail in the present embodiment. FIG. 4 is a schematic structural diagram of the data labeling apparatus according to an embodiment of the present disclosure. As shown in FIG. 4, the data labeling apparatus comprises: an acquiring module 410, a pre-labeling module 420 and a labeling-correction module 430.

Particularly, the acquiring module 410 is configured for, based on a knowledge graph, remotely acquiring data to be labeled. The pre-labeling module 420 is configured for performing data cleaning and pre-labeling to the data to be labeled, to obtain pre-labeled data. The labeling-correction module 430 is configured for performing labeling correction to the pre-labeled data.

As an optional implementation of the embodiments of the present disclosure, the labeling-correction module 430 is particularly configured for monitoring a labeling action to an entity in the pre-labeled data, and according to the monitored entity labeling action, performing labeling correction to the pre-labeled data.

As an optional implementation of the embodiments of the present disclosure, the labeling-correction module 430 is particularly configured for, according to the monitored entity labeling action, determining a labeling-omitted new entity and an erroneously labeled entity in the pre-labeled data, and according to the labeling-omitted new entity and the erroneously labeled entity, performing labeling correction to the pre-labeled data.

Figure 5:
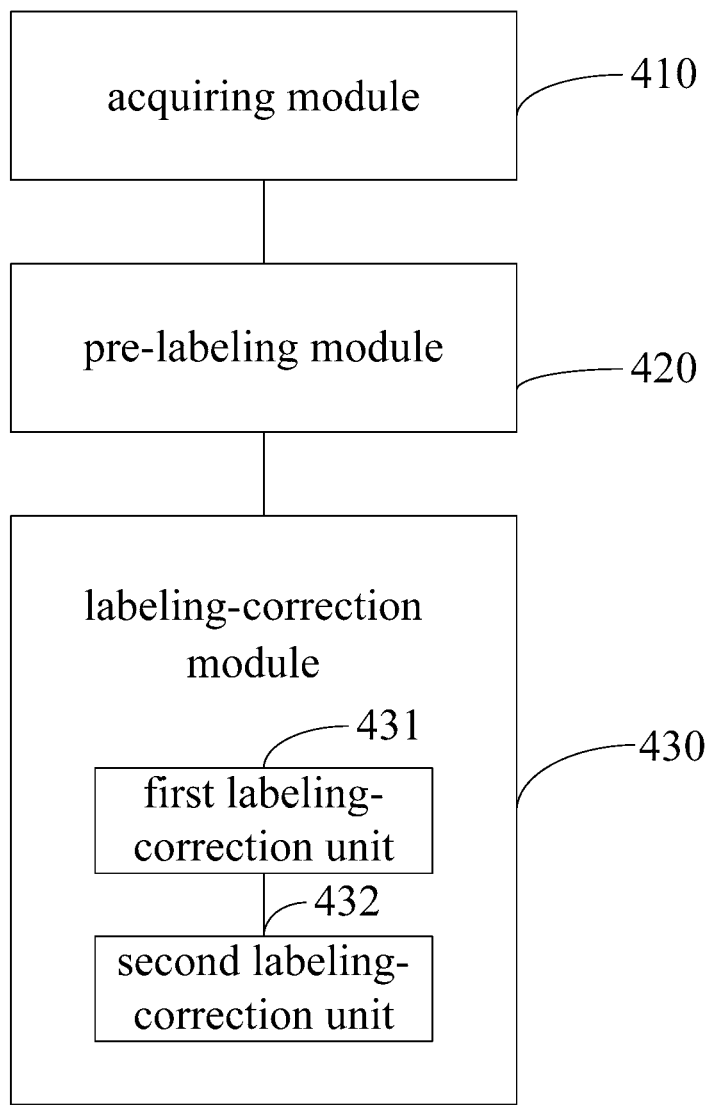
FIG. 5 is a schematic structural diagram of the data labeling apparatus according to another embodiment of the present disclosure.

As an optional implementation of the embodiments of the present disclosure, the entity labeling action comprises a new-entity labeling action and an erroneous-labeling eliminating action. As shown in FIG. 5, on the basis of FIG. 4, the labeling-correction module 430 comprises: a first labeling-correction unit 431 and a second labeling-correction unit 432.

Particularly, the first labeling-correction unit 431 is configured for, when the monitored entity labeling action is the new-entity labeling action, determining that a first entity corresponding to the new-entity labeling action is a labeling-omitted new entity, and labeling the first entity located at other positions in the pre-labeled data. The second labeling-correction unit 432 is configured for, when the monitored entity labeling action is the erroneous-labeling eliminating action, determining that a second entity corresponding to the erroneous-labeling eliminating action is an erroneously labeled entity, counting up a time quantity of the second entity being eliminated the labeling, and according to the time quantity of the second entity being eliminated the labeling, performing labeling elimination to the second entity located at other positions in the pre-labeled data.

As an optional implementation of the embodiments of the present disclosure, the second labeling-correction unit 432 is particularly configured for counting up a total quantity of labeling actions to the second entity; calculating a ratio of the time quantity of the second entity being eliminated the labeling to the total quantity of the labeling actions; and when the ratio is greater than a preset threshold, performing labeling elimination to the second entity located at other positions in the pre-labeled data.

The data labeling apparatus according to the embodiments of the present disclosure, by, based on a knowledge graph, remotely acquiring data to be labeled; performing data cleaning and pre-labeling to the data to be labeled, to obtain pre-labeled data; and performing labeling correction to the pre-labeled data, can realize, while ensuring the quality of the data labeling, automatically labeling the entities in the data by using the NLP technique, and then, by labeling correction, handling the problems of omitted labeling and erroneous labeling, which reduces the burden of artificial data labeling to a certain extent, and increases the efficiency of entity data labeling. It should be noted that all of the acquiring module 410, the pre-labeling module 420, the labeling-correction module 430, the first labeling-correction unit and the second labeling-correction unit in the data labeling apparatus may be embodied by hardwares such as a computer, a central processing unit (CPU), and a Field-Programmable Gate Array (referred to for short as FPGA).

Figure 6:
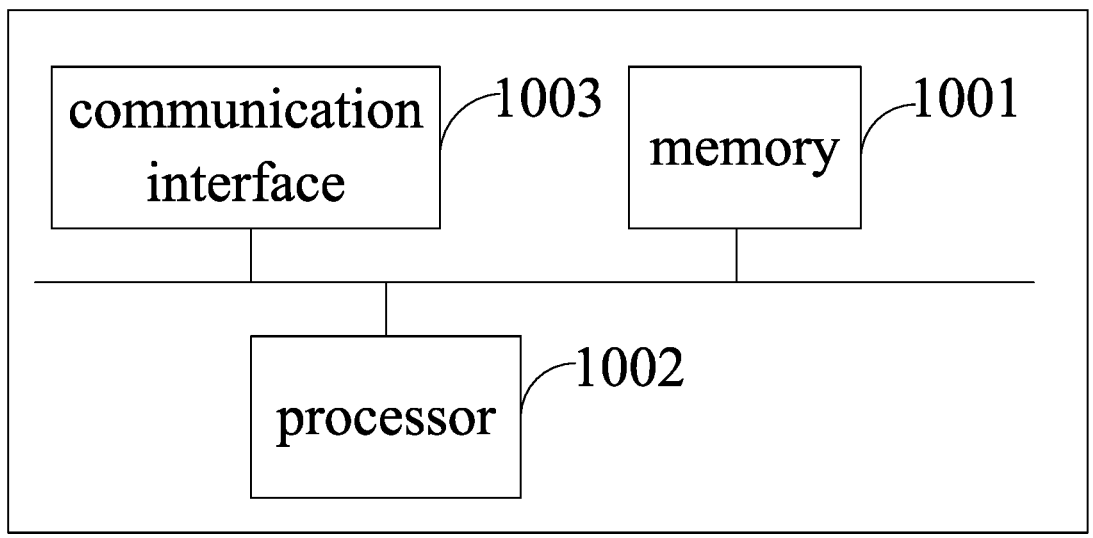
FIG. 6 is a schematic structural diagram of the data labeling device according to an embodiment of the present disclosure.

In order to implement the above embodiments, an embodiment of the present disclosure further provides a data labeling device. FIG. 6 is a schematic structural diagram of the data labeling device according to an embodiment of the present disclosure. It comprises a memory 1001 and a processor 1002. The memory 1001 stores a computer program. The processor 1002, when executing the computer program, implements the data labeling method according to the above embodiments.

Optionally, the data labeling device further comprises: a communication interface 1003, configured for the communication between the memory 1001 and the processor 1002.

The memory 1001 is configured for storing a computer program executable on the processor 1002. The memory 1001 may include a high-speed RAM memory, and may also include a non-volatile memory, for example, at least one magnetic-disk storage. The processor 1002 is configured for, when executing the program, implementing the data labeling method according to the above embodiments. If the memory 1001, the processor 1002 and the communication interface 1003 are independently embodied, then the communication interface 1003, the memory 1001 and the processor 1002 may be interconnected by a bus to complete the communication therebetween. The bus may be an Industry Standard Architecture (referred to for short as ISA) bus, a Peripheral Component (referred to for short as PCI) bus, an Extended Industry Standard Architecture (referred to for short as EISA) bus and so on. The bus may comprise an address bus, a data bus, a control bus and so on. In order to facilitate the illustration, it is merely represented by a thick line in FIG. 6, but that does not mean that there is merely one bus or one type of bus.

Optionally, in a particular implementation, if the memory 1001, the processor 1002 and the communication interface 1003 are embodied integrally on one chip, then the memory 1001, the processor 1002 and the communication interface 1003 may complete the communication therebetween via internal interfaces.

The processor 1002 may be a Central Processing Unit (referred to for short as CPU), or an Application Specific Integrated Circuit (referred to for short as ASIC), or one or more integrated circuits configured for implementing the embodiments of the present disclosure.

In order to implement the above embodiments, an embodiment of the present disclosure further provides a nonvolatile computer-readable storage medium, storing a computer program, wherein the computer program, when executed by a processor, implements the data labeling method according to any one of the above embodiments.

A person skilled in the art, after considering the description and implementing the contents disclosure herein, will readily envisage other embodiments of the present disclosure. The present disclosure aims at encompassing any variations, uses or adaptative alternations of the present disclosure, wherein those variations, uses or adaptative alternations follow the general principle of the present disclosure and include common knowledge or common technical means in the art that are not disclosed by the present disclosure. The description and the embodiments are merely deemed as exemplary, and the true scope and spirit of the present disclosure are presented by the claims.

It should be understood that the present disclosure is not limited to the accurate structure that has been described above and shown in the drawings, and may have various modifications and variations without departing from its scope. The scope of the present disclosure is merely limited by the appended claims.

The invention claimed is:

1. A data labeling method, wherein the method comprises:
based on a knowledge graph, remotely acquiring data to be labeled;
performing data cleaning and pre-labeling to the data to be labeled, to obtain pre-labeled data; and
performing labeling correction to the pre-labeled data;
wherein the step of performing data cleaning and pre-labeling to the data to be labeled, to obtain the pre-labeled data comprises:
determining whether the data to be labeled contain a pronoun;
if yes, according to an inter-sentence meaning of the data to be labeled, replacing the pronoun in the data to be labeled with a corresponding entity word, and according to a plurality of instances of the entity word and entity types of the plurality of entity words, pre-labeling the data to be labeled obtained after the pronoun replacement to obtain the pre-labeled data; and
if no, according to a plurality of entity words and entity types of the plurality of entity words, pre-labeling the data to be labeled, to obtain the pre-labeled data;
wherein the step of determining whether the data to be labeled contain a pronoun comprises:
performing sentence segmentation to the data to be labeled obtained after the data cleaning, performing word segmentation to sentences obtained after the sentence segmentation by using a Natural Language Processing toolkit, to obtain multiple segmented words corresponding to the data to be labeled, and determining whether the obtained segmented words include a pronoun, wherein the Natural Language Processing toolkit is Jieba or Stanford CoreNLP.

2. The method according to claim 1, wherein the step of performing labeling correction to the pre-labeled data comprises:
monitoring a labeling action to an entity in the pre-labeled data, and according to the monitored entity labeling action, performing labeling correction to the pre-labeled data.

3. The method according to claim 2, wherein the step of, according to the monitored entity labeling action, performing labeling correction to the pre-labeled data comprises:
according to the monitored entity labeling action, determining a labeling-omitted new entity and an erroneously labeled entity in the pre-labeled data, and according to the labeling-omitted new entity and the erroneously labeled entity, performing labeling correction to the pre-labeled data.

4. The method according to claim 3, wherein the entity labeling action comprises a new-entity labeling action and an erroneous-labeling eliminating action; and
the step of, according to the monitored entity labeling action, determining the labeling-omitted new entity and the erroneously labeled entity in the pre-labeled data, and according to the labeling-omitted new entity and the erroneously labeled entity, performing labeling correction to the pre-labeled data comprises:
when the monitored entity labeling action is the new-entity labeling action, determining that a first entity corresponding to the new-entity labeling action is a labeling-omitted new entity, and labeling the first entity located at other positions in the pre-labeled data; and
when the monitored entity labeling action is the erroneous-labeling eliminating action, determining that a second entity corresponding to the erroneous-labeling eliminating action is an erroneously labeled entity, counting up a time quantity of the second entity being eliminated the labeling, and according to the time quantity of the second entity being eliminated the labeling, performing labeling elimination to the second entity located at other positions in the pre-labeled data.

5. The method according to claim 4, wherein the step of, according to the time quantity of the second entity being eliminated the labeling, performing labeling elimination to the second entity located at other positions in the pre-labeled data comprises:
counting up a total quantity of labeling actions to the second entity;

calculating a ratio of the time quantity of the second entity being eliminated the labeling to the total quantity of the labeling actions; and when the ratio is greater than a preset threshold, performing labeling elimination to the second entity located at other positions in the pre-labeled data.

6. The method according to claim 1, wherein the step of, based on the knowledge graph, remotely acquiring the data to be labeled comprises:

according to the knowledge graph, acquiring a triad entity pair containing entities to be labeled;

determining a vertical website corresponding to the knowledge graph; and based on the triad entity pair, remotely acquiring from the vertical website the data to be labeled containing the triad entity pair.

7. The method according to claim 6, wherein the step of, based on the triad entity pair, remotely acquiring from the vertical website the data to be labeled containing the triad entity pair comprises:

acquiring a text content in the vertical website;

for the triad entity pair and a corresponding entity relation thereof, searching the text content in the vertical website for a sentence containing the triad entity pair; and using the searched sentence containing the triad entity pair as the data to be labeled having the corresponding entity relation.

8. A nonvolatile computer-readable storage medium, storing a computer program, wherein the computer program, when executed by a processor, implements the data labeling method according to claim 1.

9. A data labeling device, wherein the device comprises:
a processor; and
a memory, wherein the memory stores a computer instruction, and the computer instruction, when executed by the processor, causes the processor to perform the operations of:

based on a knowledge graph, remotely acquiring data to be labeled;

performing data cleaning and pre-labeling to the data to be labeled, to obtain pre-labeled data; and performing labeling correction to the pre-labeled data;

wherein the computer instruction, when executed by the processor, causes the processor to further perform the operations of:

determining whether the data to be labeled contain a pronoun;

if yes, according to an inter-sentence meaning of the data to be labeled, replacing the pronoun in the data to be labeled with a corresponding entity word, and according to a plurality of instances of the entity word and entity types of the plurality of entity words, pre-labeling the data to be labeled obtained after the pronoun replacement to obtain the pre-labeled data; and if no, according to a plurality of entity words and entity types of the plurality of entity words, pre-labeling the data to be labeled, to obtain the pre-labeled data;

wherein the step of determining whether the data to be labeled contain a pronoun comprises:

performing sentence segmentation to the data to be labeled obtained after the data cleaning, performing word segmentation to sentences obtained after the sentence segmentation by using a Natural Language Processing toolkit, to obtain multiple segmented words corresponding to the data to be labeled, and determining whether the obtained segmented words include a pronoun, wherein the Natural Language Processing toolkit is Jieba or Stanford CoreNLP.

10. The device according to claim 9, wherein the computer instruction, when executed by the processor, causes the processor to further perform the operations of:

monitoring a labeling action to an entity in the pre-labeled data, and according to the monitored entity labeling action, performing labeling correction to the pre-labeled data.

11. The device according to claim 10, wherein the computer instruction, when executed by the processor, causes the processor to further perform the operations of:

according to the monitored entity labeling action, determining a labeling-omitted new entity and an erroneously labeled entity in the pre-labeled data, and according to the labeling-omitted new entity and the erroneously labeled entity, performing labeling correction to the pre-labeled data.

12. The device according to claim 11, wherein the entity labeling action comprises a new-entity labeling action and an erroneous-labeling eliminating action; and the computer instruction, when executed by the processor, causes the processor to further perform the operations of:

when the monitored entity labeling action is the new-entity labeling action, determining that a first entity corresponding to the new-entity labeling action is a labeling-omitted new entity, and labeling the first entity located at other positions in the pre-labeled data; and when the monitored entity labeling action is the erroneous-labeling eliminating action, determining that a second entity corresponding to the erroneous-labeling eliminating action is an erroneously labeled entity, counting up a time quantity of the second entity being eliminated the labeling, and according to the time quantity of the second entity being eliminated the labeling, performing labeling elimination to the second entity located at other positions in the pre-labeled data.

13. The device according to claim 12, wherein the computer instruction, when executed by the processor, causes the processor to further perform the operations of:

counting up a total quantity of labeling actions to the second entity;

calculating a ratio of the time quantity of the second entity being eliminated the labeling to the total quantity of the labeling actions; and when the ratio is greater than a preset threshold, performing labeling elimination to the second entity located at other positions in the pre-labeled data.

14. The device according to claim 9, wherein the computer instruction, when executed by the processor, causes the processor to further perform the operations of:

according to the knowledge graph, acquiring a triad entity pair containing entities to be labeled;

determining a vertical website corresponding to the knowledge graph; and based on the triad entity pair, remotely acquiring from the vertical website the data to be labeled containing the triad entity pair.

15. The device according to claim 14, wherein the computer instruction, when executed by the processor, causes the processor to further perform the operations of:

acquiring a text content in the vertical website;

for the triad entity pair and a corresponding entity relation thereof, searching the text content in the vertical website for a sentence containing the triad entity pair; and using the searched sentence containing the triad entity pair as the data to be labeled having the corresponding entity relation.

* * * * *